United States Patent
Jeter et al.

(10) Patent No.: US 8,453,147 B2
(45) Date of Patent: May 28, 2013

(54) TECHNIQUES FOR REDUCING THREAD OVERHEAD FOR SYSTEMS WITH MULTIPLE MULTI-THREADED PROCESSORS

(75) Inventors: Robert Jeter, Holly Springs, NC (US); John Marshall, Cary, NC (US); William Lee, Cary, NC (US); Trevor Garner, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1821 days.

(21) Appl. No.: 11/446,609

(22) Filed: Jun. 5, 2006

(65) Prior Publication Data

US 2007/0283357 A1    Dec. 6, 2007

(51) Int. Cl.
*G06F 9/46*    (2006.01)

(52) U.S. Cl.
USPC ............ 718/102; 718/100; 718/101; 718/104

(58) Field of Classification Search
USPC .................. 718/100, 101, 102, 103, 104, 107
See application file for complete search history.

(56) References Cited

U.S. PATENT DOCUMENTS

| | | |
|---|---|---|
| 4,096,571 A | 6/1978 | Vander Mey |
| 4,400,768 A | 8/1983 | Tomlinson |
| 4,918,600 A | 4/1990 | Harper, III |
| 5,088,032 A | 2/1992 | Bosack |
| 5,247,645 A | 9/1993 | Mirza |
| 5,394,553 A | 2/1995 | Lee |
| 5,428,803 A | 6/1995 | Chan |
| 5,479,624 A | 12/1995 | Lee |
| 5,561,669 A | 10/1996 | Lenney et al. |
| 5,561,784 A | 10/1996 | Chen |
| 5,617,421 A | 4/1997 | Chin |
| 5,724,600 A | 3/1998 | Ogi |
| 5,740,171 A | 4/1998 | Mazzola et al. |
| 5,742,604 A | 4/1998 | Edsall et al. |
| 5,764,636 A | 6/1998 | Edsall |

(Continued)

FOREIGN PATENT DOCUMENTS

EP    744696    11/1996

OTHER PUBLICATIONS

Stolowitz Ford Cowger LLP, Listing of Related Cases, Nov. 23, 2009.
PCT/US04/05522, International Search Report, Oct. 18, 2004.

*Primary Examiner* — Emerson Puente
*Assistant Examiner* — Willy W Huaracha
(74) *Attorney, Agent, or Firm* — Leon R. Turkevich

(57) ABSTRACT

Techniques for processing requests from a processing thread for a shared resource shared among threads on one or more processors include receiving a bundle of requests from a portion of a thread that is executed during a single wake interval on a particular processor. The bundle includes multiple commands for one or more shared resources. The bundle is processed at the shared resource(s) to produce a bundle result. The bundle result is sent to the particular processor. The thread undergoes no more than one wake interval to sleep interval cycle while the bundle commands are processed at the shared resource(s). These techniques allow a lock for shared resource(s) to be obtained, used and released all while the particular thread is sleeping, so that locks are held for shorter times than in conventional approaches. Using these techniques, line rate packet processing is more readily achieved in routers with multiple multi-threaded processors.

18 Claims, 8 Drawing Sheets

U.S. PATENT DOCUMENTS

| | | | |
|---|---|---|---|
| 5,787,255 A | 7/1998 | Parlan et al. | |
| 5,787,485 A | 7/1998 | Fitzgerald et al. | |
| 5,796,732 A | 8/1998 | Mazzola et al. | |
| 5,838,915 A | 11/1998 | Klausmeier et al. | |
| 5,852,607 A | 12/1998 | Chin | |
| 5,909,550 A | 6/1999 | Shankar et al. | |
| 5,982,655 A | 11/1999 | Doyle | |
| 6,026,464 A | 2/2000 | Cohen | |
| 6,119,215 A | 9/2000 | Key et al. | |
| 6,178,429 B1 | 1/2001 | Cherf | |
| 6,195,107 B1 | 2/2001 | Iverson | |
| 6,222,380 B1 | 4/2001 | Gerowitz et al. | |
| 6,272,621 B1 | 8/2001 | Key et al. | |
| 6,308,219 B1 | 10/2001 | Hughes | |
| 6,430,242 B1 | 8/2002 | Buchanan et al. | |
| 6,487,202 B1 | 11/2002 | Klausmeier et al. | |
| 6,487,591 B1 | 11/2002 | Budhraja et al. | |
| 6,505,269 B1 | 1/2003 | Potter | |
| 6,529,983 B1 | 3/2003 | Marshall et al. | |
| 6,535,963 B1 | 3/2003 | Rivers | |
| 6,611,217 B2 | 8/2003 | Buchanan et al. | |
| 6,662,252 B1 * | 12/2003 | Marshall et al. | 710/200 |
| 6,681,341 B1 | 1/2004 | Fredenburg et al. | |
| 6,708,258 B1 | 3/2004 | Potter et al. | |
| 6,718,448 B1 * | 4/2004 | Ofer | 711/163 |
| 6,728,839 B1 | 4/2004 | Marshall | |
| 6,757,768 B1 | 6/2004 | Potter et al. | |
| 6,795,901 B1 | 9/2004 | Florek et al. | |
| 6,801,997 B2 | 10/2004 | Joy et al. | |
| 6,804,162 B1 | 10/2004 | Eldridge et al. | |
| 6,804,815 B1 | 10/2004 | Kerr et al. | |
| 6,832,279 B1 | 12/2004 | Potter et al. | |
| 6,839,797 B2 | 1/2005 | Calle et al. | |
| 6,876,961 B1 | 4/2005 | Marshall et al. | |
| 6,895,481 B1 | 5/2005 | Mitten et al. | |
| 6,918,116 B2 | 7/2005 | Ang | |
| 6,920,562 B1 | 7/2005 | Kerr et al. | |
| 6,965,615 B1 | 11/2005 | Kerr et al. | |
| 6,970,435 B1 | 11/2005 | Buchanan et al. | |
| 6,973,521 B1 | 12/2005 | Indiresan et al. | |
| 6,986,022 B1 | 1/2006 | Marshall et al. | |
| 7,047,370 B1 | 5/2006 | Jeter, Jr. et al. | |
| 7,100,021 B1 | 8/2006 | Marshall et al. | |
| 7,124,231 B1 | 10/2006 | Garner et al. | |
| 7,139,899 B2 | 11/2006 | Kerr et al. | |
| 7,155,576 B1 | 12/2006 | Garner et al. | |
| 7,155,588 B1 | 12/2006 | Jeter, Jr. | |
| 7,174,394 B1 | 2/2007 | Garner et al. | |
| 7,185,224 B1 | 2/2007 | Fredenburg et al. | |
| 7,194,568 B2 | 3/2007 | Jeter | |
| 7,254,687 B1 | 8/2007 | Jeter, Jr. | |
| 7,257,681 B2 | 8/2007 | Jeter, Jr. et al. | |
| 7,290,096 B2 | 10/2007 | Jeter, Jr. et al. | |
| 7,290,105 B1 | 10/2007 | Jeter | |
| 7,302,548 B1 | 11/2007 | Mitten et al. | |
| 7,346,059 B1 | 3/2008 | Garner et al. | |
| 7,411,957 B2 | 8/2008 | Stacy et al. | |
| 7,434,016 B2 | 10/2008 | Jeter, Jr. | |
| 7,447,872 B2 | 11/2008 | Schroter et al. | |
| 7,461,180 B2 | 12/2008 | Lee et al. | |
| 7,464,243 B2 | 12/2008 | Haridas et al. | |
| 7,623,455 B2 | 11/2009 | Hilla et al. | |
| 7,640,355 B1 | 12/2009 | Marshall et al. | |
| 7,848,332 B2 | 12/2010 | Lee et al. | |
| 8,010,966 B2 * | 8/2011 | Jeter et al. | 718/102 |
| 2001/0001871 A1 | 5/2001 | Rust | |
| 2003/0048209 A1 | 3/2003 | Buchanan et al. | |
| 2003/0058277 A1 * | 3/2003 | Bowman-Amuah | 345/765 |
| 2003/0159021 A1 | 8/2003 | Kerr et al. | |
| 2003/0225995 A1 | 12/2003 | Schroter et al. | |
| 2004/0186945 A1 * | 9/2004 | Jeter et al. | 711/5 |
| 2004/0213235 A1 | 10/2004 | Marshall et al. | |
| 2004/0252710 A1 | 12/2004 | Jeter, Jr. et al. | |
| 2005/0010690 A1 | 1/2005 | Marshall et al. | |
| 2005/0171937 A1 | 8/2005 | Hughes et al. | |
| 2005/0213570 A1 | 9/2005 | Stacy et al. | |
| 2006/0104268 A1 | 5/2006 | Lee et al. | |
| 2006/0136682 A1 | 6/2006 | Haridas et al. | |
| 2006/0184753 A1 | 8/2006 | Jeter, Jr. et al. | |
| 2006/0221974 A1 | 10/2006 | Hilla et al. | |
| 2007/0067592 A1 | 3/2007 | Jeter, Jr. | |
| 2007/0095368 A1 | 5/2007 | Girard et al. | |
| 2007/0283357 A1 | 12/2007 | Jeter et al. | |
| 2007/0294694 A1 | 12/2007 | Jeter | |
| 2008/0005296 A1 | 1/2008 | Lee et al. | |
| 2008/0013532 A1 | 1/2008 | Garner et al. | |
| 2008/0077926 A1 | 3/2008 | Jeter et al. | |

* cited by examiner

FIG. 3A

| VAL 1b | ID 8b | EOB 1b | FUNC 2b | OP 6b | PRED SRC 1b | IG RTN 1b | FL 1b | SRC1 4b | SRC2 4b | DEST 4b | PRED DEST 1b | REG A 64b | REG B 64b |
|---|---|---|---|---|---|---|---|---|---|---|---|---|---|
| 301 | 302 | 303 | 304 | 305 | 306 | 307 | 308 | 309 | 310 | 311 | 312 | 313 | 314 |

300 REQUEST FORMAT

FIG. 3B

| ID 8b | RESULT 64b | RC 4b |
|---|---|---|
| 302 | 333 | 335 |

330 RESULT FORMAT

501 METHOD AT SHARED RESOURCE DISTRIBUTION BLOCK

502 METHOD AT SHARED RESOURCE DISTRIBUTION BLOCK

TECHNIQUES FOR REDUCING THREAD OVERHEAD FOR SYSTEMS WITH MULTIPLE MULTI-THREADED PROCESSORS

BACKGROUND OF THE INVENTION

1. Field of the Invention

The present invention relates to using resources shared by multiple processors that each allow multiple processing threads that swap time on a processor and, in particular, to using a bundle of operations for the shared resources to reduce an average length of time a thread holds a lock on a shared resource or is swapped off the processor in the system, or both.

2. Description of the Related Art

Many digital data systems are heavily utilized and rely on multiple processors to handle their work load. Likewise, many processors are designed to reduce idle time by swapping multiple processing threads. A thread is a set of data contents for processor registers and a sequence of instructions to operate on those contents. Some instructions involve sending a command to another component of the device or system, such as input/output devices or one or more high valued components that take many processor clock cycles to respond. Rather than waiting idly for the other component to respond, the processor stores the contents of the registers and the current command or commands of the current thread to local memory, thus "swapping" the thread out, also described as putting the thread to "sleep." Then the contents and commands of a different sleeping thread are taken on board, so called "swapped" onto the processor, also described as "awakening" the thread. The woken thread is then processed until another wait condition occurs. A thread-scheduler is responsible for swapping threads on and off the processor from and to local memory. Threads are widely known and used commercially, for example in operating systems for most computers.

Some thread wait conditions result from use of a high-value shared resource, such as expensive static random access memory (SRAM), quad data rate (QDR) SRAM, content access memory (CAM) and ternary CAM (TCAM), all components well known in the art of digital processing. To guarantee exclusive access to the shared resource or a portion of the shared resource, a lock is placed on that portion while one of the threads on one of the processors uses the resource for certain operations. The lock is released when the thread is finished with such an operation involving the shared resource. The use of locks to control access to a shared resource is widely known and practiced commercially in a large number of devices and systems, including operating systems, and database management systems.

For example, intermediate network nodes that process a large number of data packets, for example, to support real-time voice communications, use expensive QDR and TCAM components that are shared among multiple processors. Locks are obtained to control access to such resources for some operations. For example, when a routing table is updated, a TCAM access is performed to obtain the current link associated with a particular address. To prevent another process from trying to access the same record being updated, a lock is obtained for the TCAM entry. The TCAM result is used to find and update a related data structure. After the related data structure is updated, then the lock is released. In routers that process many data packets in a flow directed to or coming from the same end node, it is very likely that the very routing table entry being updated is also being accessed to process another data packet. Thus a lock on the entry is acquired and released after several memory access operations on the shared resources.

In one approach, lock mechanisms include a lock controller for each resource. A thread seeking to use a resource requests a lock. While waiting for the response, the thread is swapped off the processor, and a different sleeping thread eligible for running on the processor is swapped on. A thread scheduler on the processor determines which thread is eligible to be swapped onto the processor. One requirement for eligibility is that any lock requested by the thread be received at the processor.

While suitable for many purposes, there are some deficiencies associated with conventional mechanisms for obtaining locks on shared resources.

One disadvantage is that when a thread is swapped off, one or more other threads gain precedence in the thread scheduler, and the sleeping thread must wait several thread switching cycles before regaining control of the processor. This wait often is substantially longer than the time to receive the requested response or lock. As a consequence, the thread waits longer than necessary for a response and holds a lock longer than necessary, often while the thread is sleeping. This blocks other threads that wish to obtain a lock for the same portion of the resource. The amount of time that a sleeping thread holds a lock to a resource while the thread is sleeping adds to the lock overhead,. Even without locks, the amount of time that a response is held at a processor for a sleeping thread adds to the thread overhead. As used here thread overhead includes the lock overhead as well as tie that the thread is sleeping while a response has already been received for the thread at a processor. In a blocked multi-threaded model, a thread runs until it voluntarily gives up the processor. In such cases, the lock and thread overhead can be considerable, and amount to a choke point in the throughput of the device.

Another disadvantage is that several shared resources are often used in series and thus a thread is swapped off several times to complete a series of operations that are performed essentially by the shared components and essentially not by the processor. This further increases the thread overhead.

Another disadvantage arises in the conventional mechanisms when there are several shared resources or several multi-threaded processors, or both. A data communications bus connects each processor to each resource to send the commands and receive the response data from the shared resource. The buses are a set of parallel wires, with the number of wires in the set corresponding to the number of bits the bus sends in each clock cycle. The number of parallel wires is called the bus width. Bus widths of 32, 64 and 128 bits are not uncommon in various applications. The manufacturing complexity and space consumed by wide busses crossing from several processors to several shared resources severely limits the number of shared resources and number of processors that can be built for a given cost.

Based on the foregoing, there is a clear need for techniques for multiple multi-threaded processors to use shared resources that do not suffer all the deficiencies of the conventional approaches. In particular, there is a need for an architecture that does not involve separate buses from each multi-threaded processor to each shared resource. There is also a particular need for techniques to reduce the thread overhead for threads that use several shared resources in sequence, with or without lock, that do not involve repeatedly swapping the thread off its processor.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram that illustrates a request format for one request in a request bundle, according to an embodiment;

FIG. 3B is a block diagram that illustrates a result format for a result from a shared resource in response to one request in a request bundle, according to an embodiment;

DETAILED DESCRIPTION

Techniques are described for processing requests from a processing thread for off-processor resources shared among multiple threads. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in detail below in the context of a switching system on a router that has four processors, each allowing up to four threads, that share use of a TCAM and QDR using a lock controller for updating routing tables while forwarding data packets at a high speed line rate. However, the invention is not limited to this context. In various other embodiments, more or fewer processors allowing more or fewer threads share more or fewer components of the same or different types, with or without a lock controller in the same or different devices.

2.0 Network Overview

Figure 1:
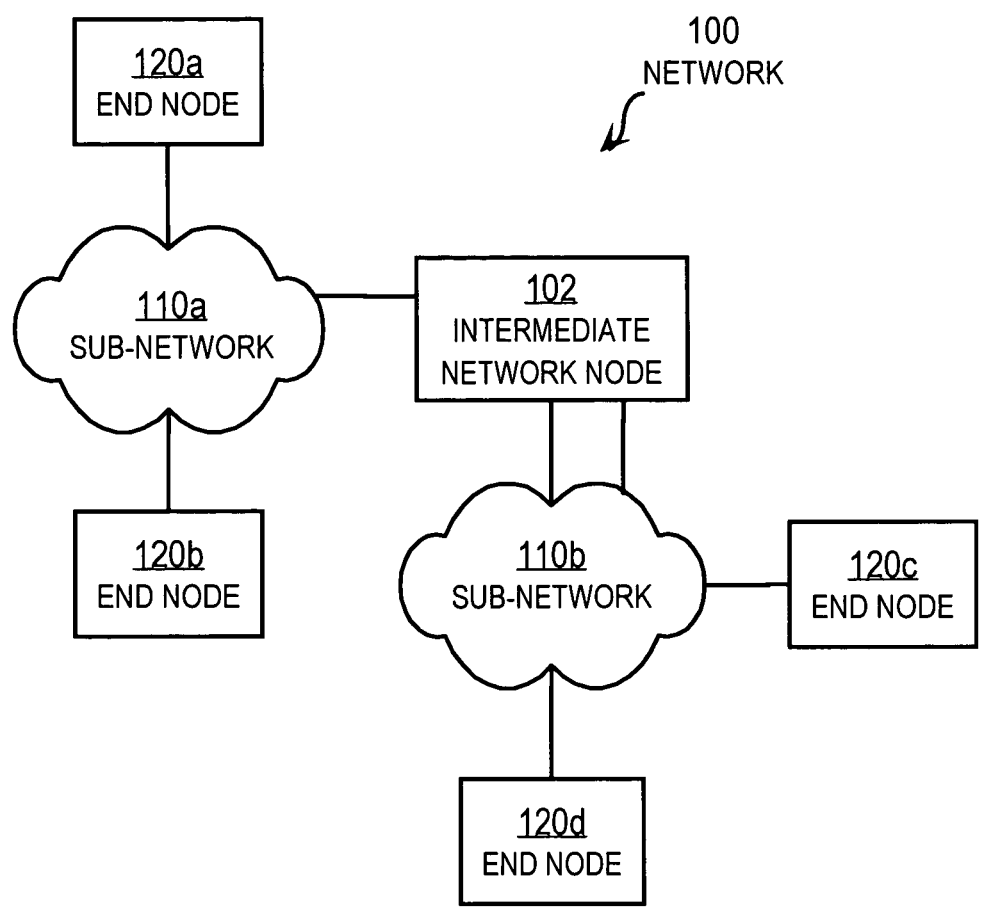
FIG. 1 is a block diagram that illustrates a network 100, according to an embodiment.

FIG. 1 is a block diagram that illustrates a network 100, according to an embodiment. A computer network is a geographically distributed collection of interconnected sub-networks (e.g., sub-networks 110a, 110b, collectively referenced hereinafter as sub-network 110) for transporting data between nodes, such as computers, personal data assistants (PDAs) and special purpose devices. A local area network (LAN) is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, e.g., intermediate network node 102, such as a router or switch, that facilitates routing data between end nodes 120. As used herein, an end node 120 is a node that is configured to originate or terminate communications over the network. In contrast, an intermediate network node 102 facilitates the passage of data between end nodes. Each sub-network 110 includes zero or more intermediate network nodes. Although, for purposes of illustration, intermediate network node 102 is connected by one communication link to sub-network 110a and thereby to end nodes 120a, 120b and by two communication links to sub-network 110b and end nodes 120c, 120d, in other embodiments an intermediate network node 102 may be connected to more or fewer sub-networks 110 and directly or indirectly to more or fewer end nodes 120 and directly to more other intermediate network nodes.

Information is exchanged between network nodes according to one or more of many well known, new or still developing protocols. In this context, a protocol consists of a set of rules defining how the nodes interact with each other based on information sent over the communication links. Communications between nodes are typically effected by exchanging discrete packets of data. Each data packet typically comprises 1] header information associated with a particular protocol, and 2] payload information that follows the header information and contains information to be processed independently of that particular protocol. In some protocols, the packet includes 3] trailer information following the payload and indicating the end of the payload information. The header includes information such as the source of the data packet, its destination, the length of the payload, and other properties used by the protocol. Often, the data in the payload for the particular protocol includes a header and payload for a different protocol associated with a different function at the network node.

The intermediate node (e.g., node 102) typically receives data packets and forwards the packets in accordance with predetermined routing information that is distributed among intermediate nodes in control plane data packets using a routing protocol. The intermediate network node 102 is configured to store data packets between reception and transmission, to determine a link over which to transmit a received data packet, and to transmit the data packet over that link.

According to some embodiments of the invention described below, the intermediate network node 102 includes four processors that allow up to four threads, and includes a TCAM and QDR memory to share among those threads. The TCAM is used to store route information so that it can be retrieved quickly based on a destination address, e.g., an Internet Protocol (IP) address or a media Access Control (MAC) address. According to an example embodiment, the TCAM stores each destination address in association with a SRAM address where information is stored about data structures located by an index into a QDR SRAM. Based on the index, a record of route information for the route associated with that destination is retrieved, updated, and stored back into the QDR SRAM. When route information for a route is to be updated, a lock is obtained to guarantee exclusive access to the route information record and preventing other processes in the intermediate network node 102 from accessing the same route information record.

With conventional lock mechanisms for resources shared among multiple different processors, a lock is requested by a thread on a processor and sent to a lock controller, while the thread is switched off the processor. When the lock is eventually granted, sent to and received at the processor, its thread is often still asleep. The thread that requested the lock is now ready to run but may have to wait for the current running thread to finish running and possibly for other ready waiting threads to run as well. The lock is held by the sleeping thread. When that thread is again switched onto the processor, and is again awake and running, it uses the lock to send a request to the TCAM for an index associated with a network address. That request is then sent to the TCAM and the thread is again put to sleep, still holding the lock. When the response from the TCAM is received at the processor, its thread is again often still sleeping. The lock continues to be held until the thread is switched back onto the processor. While again awake, the thread receives the TCAM index and uses it to retrieve a route record from the QDR SRAM. The QDR request is sent to the shared QDR SRAM and the thread again is switched off the processor, still holding the lock, while the QDR response is pending. When the QDR response is received back at the processor, its thread is often still sleeping. The QDR response and the lock are held by processor for the sleeping thread until that thread is again switched onto the processor. When the thread is again awake, it uses the QDR response in some way, for example to update a field, e.g., with a number of bytes transferred to the destination address of that route in the current packet. The updated field or fields are then sent in a new request to store that information in the QDR and the thread is again switched off the processor to sleep, still holding the lock. In some embodiments, the thread also releases the lock before switching off to sleep. In some embodiments, the thread does not release the lock until it receives an acknowledgement from the QDR that the write is complete. In the latter case, the thread goes to sleep still holding the lock. Finally, the QDR returns an acknowledgement that the memory location is written and the acknowledgement is held by the processor until its thread is switched back to run on the processor. Then, after four sleep to wake cycles, the lock is released.

It is desirable for a router to receive, route and transmit a data packet at the line rate of the links connected to the router. Assuming a minimum-sized packet, a Gigabit Ethernet link line rate is about 1.49 million data packets per second, and a 10 Gigabit Ethernet link line rate is about 14.9 million data packets per second. When packets arrive, they often arrive in a large number with the same destination, e.g., in a stream of voice data packets. Thus a route record locked during processing of a first packet and held for four thread sleep-to-wake cycles can cause a block or bottleneck in the processing of that stream, making it difficult to achieve line rate performance at the router.

According to embodiments of the invention, a data processing system, such as the intermediate network node 102, includes a modified mechanism for using shared resources that reduces the bottleneck of multiple wake-to-sleep cycles. Such a mechanism makes line rate performance at the router more likely. In these embodiments, multiple requests for locks or shared resources or both are issued by a thread in a single wake-to-sleep cycle, thus reducing the time that a thread sleeps while using shared resources, and consequently reducing the time that a lock, if any, is held. The illustrated embodiments involve both structural and process modifications so that all data for the multiple requests of the shared resources are available to the shared resources while the thread sleeps.

2.0 Structural Overview

Conventional elements of a router which may serve as the intermediate network node 102 in some embodiments are described in greater detail in a later section with reference to FIG. 6. At this juncture, it is sufficient to note that the router 600 includes one or more general purpose processors 602 (i.e., central processing units, CPUs), a main memory 604 and a switching system 630 connected to multiple network links 632, and a data bus 610 connecting the various components. According to some embodiments of the invention, shared memory 604 and bus 610 are modified as described in this section. For example, shared memory 604 is modified to include multiple shared, high-value memory resources such as a TCAM and QDR SRAM, and a distribution block as described in more detail below.

Figure 2A:
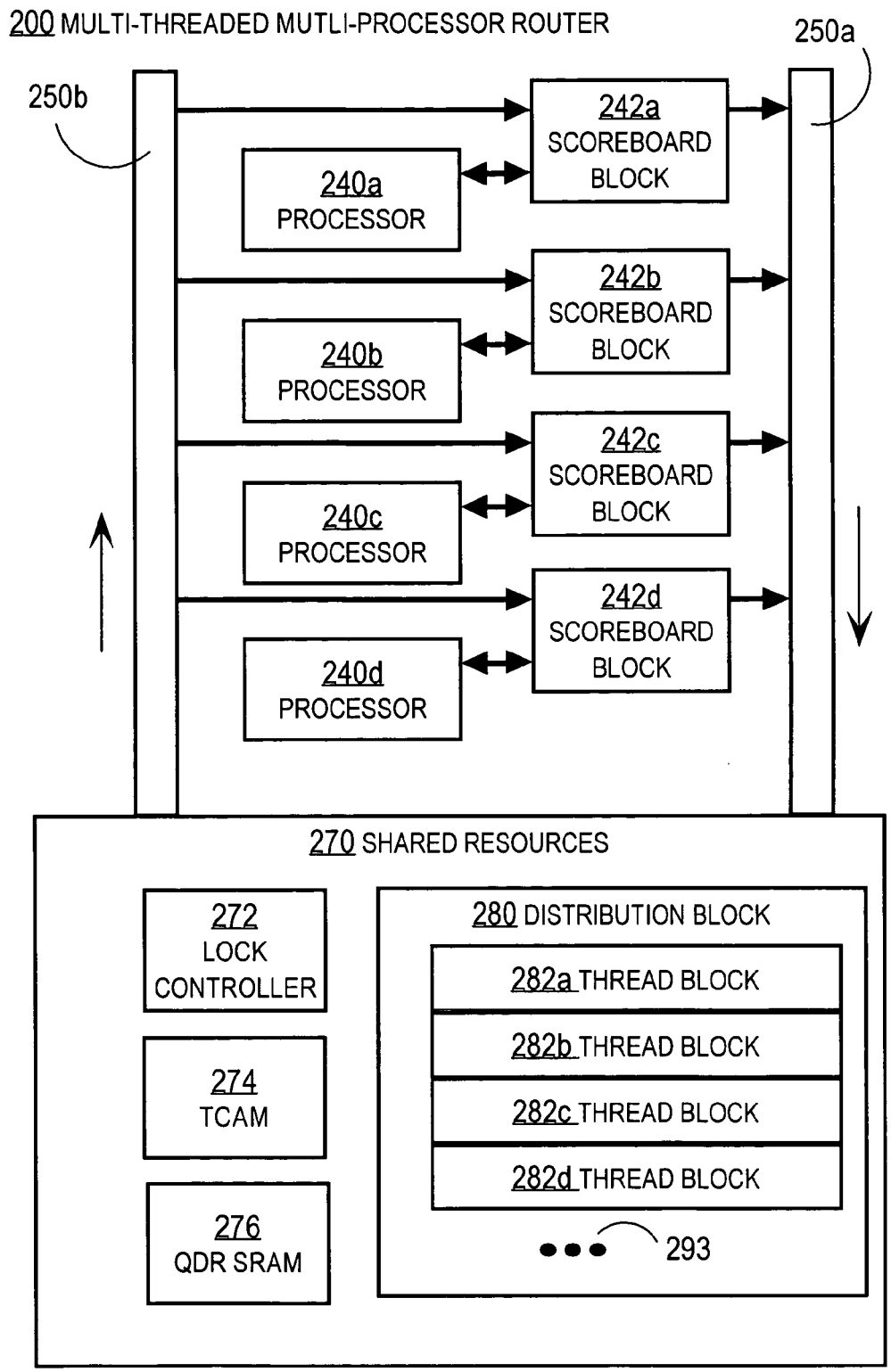
FIG. 2A is a block diagram that illustrates a multi-threaded multi-processor system, according to an embodiment in a router.

FIG. 2A is a block diagram that illustrates a multi-threaded multi-processor system, according to an embodiment in a router 200. The router 200 includes four multi-threaded processors 240a, 240b, 240c, 240d (collectively referenced hereinafter as processors 240) and four scoreboard blocks 242a, 242b, 242c, 242d (collectively referenced hereinafter as scoreboard blocks 242). A scoreboard block 242 is associated with each processor 240. The router 200 also includes a shared resources block 270 and busses 250a, 250b. The bus 250a passes data from the scoreboard blocks 242 to the shared resources block 270; and the bus 250b passes data from the shared resources block 270 to the scoreboard blocks 242. Together the bus 250a and the bus 250b constitute a ring bus (referenced hereinafter as ring bus 250).

Each processor is configured to switch among up to four processing threads. The scoreboard block 242 provides thread scheduling functions, such as keeping track of requests issued by and responses received for each thread. Although shown as a separate block in FIG. 2A, in some embodiments, the scoreboard block 242 is integrated within its associated processor 240.

In a blocked multi-threaded system, a thread executes on a processor until the thread determines that it should relinquish the processor to another thread and issues a switch thread command. The thread scheduler, such as the scoreboard block 242, then determines which of the sleeping threads, if any, to awaken and swap back onto the processor. The thread scheduler then swaps off the thread relinquishing the processor and swaps on the chosen thread to awaken. A thread that has an outstanding unfilled request (for which a response has not yet been received) is considered by the scoreboard block to be ineligible to awaken.

The shared resources block 270 includes one or more shared resources and a lock controller 272 for issuing locks as requested for any of those shared resources. In the illustrated embodiment, the shared resources include a TCAM 274 and a QDR SRAM 276. The shared resources block 270 also includes a distribution block 280 for distributing requests for shared resources and locks received from the threads on processors 240 to the lock controller 272 or TCAM 274 or QDR SRAM 276. The distribution block 280 includes thread blocks 282a, 282b, 282c, 282d and others indicated by ellipsis 293 (collectively referenced hereinafter as thread blocks 282). There is one thread block 282 for each thread that may execute on the processors 240. For example, in the illustrated embodiment, four threads are allowed on each of four processors 240 so that up to 16 threads may be defined; thus there are 16 thread blocks 282 in distribution block 260.

According to embodiments of the invention, a thread may issue multiple requests for locks and shared resources without switching off a processor between each request. The requests are accumulated in the scoreboard block 242 and are sent, when the thread indicates that the request bundle is complete, as a request bundle from the scoreboard block 242 over bus 250a to distribution block 280. The request bundle is stored in an appropriate thread block 282. The thread bundle includes not only requests for the shared resources, and any appropriate locks, but also any data used in the multiple requests and data that indicates what earlier request results are used in subsequent requests.

In some embodiments, there is a separate bus from each scoreboard block 242 to the shared resources block 270. A disadvantage of such embodiments, however, is that the multiple busses consume space on an integrated circuit and add to the complexity of wiring and cost of fabrication for the integrated circuit.

In the illustrated embodiment, a ring bus 250 is used in which all scoreboard blocks share bus 250a for traffic to the shared resources block 270 and share bus 250b for traffic from the shared resource. Any method may be used to share use of the ring bus 250. In an illustrated embodiment, on bus 250a, a time interval sufficient to send a request is dedicated to each processor. A scoreboard, which has a request bundle from a thread ready for sending to the shared resources block 270, waits for the time interval dedicated to its processor and then sends the next request from the bundle during that time interval. This time slotting avoids collision on the bus 250*a* without resorting to a bus arbitration process. In other embodiments, other time slotting or arbitration schemes are used. For example, in some embodiments, the time interval is sufficient to send an entire request bundle. Data is placed on bus 250*b* as determined by the shared resources block 270. The data placed onto bus 250*b* includes an ID for a processor and thread and is ignored by scoreboard blocks 242 not associated with the given processor ID.

Figure 2B:
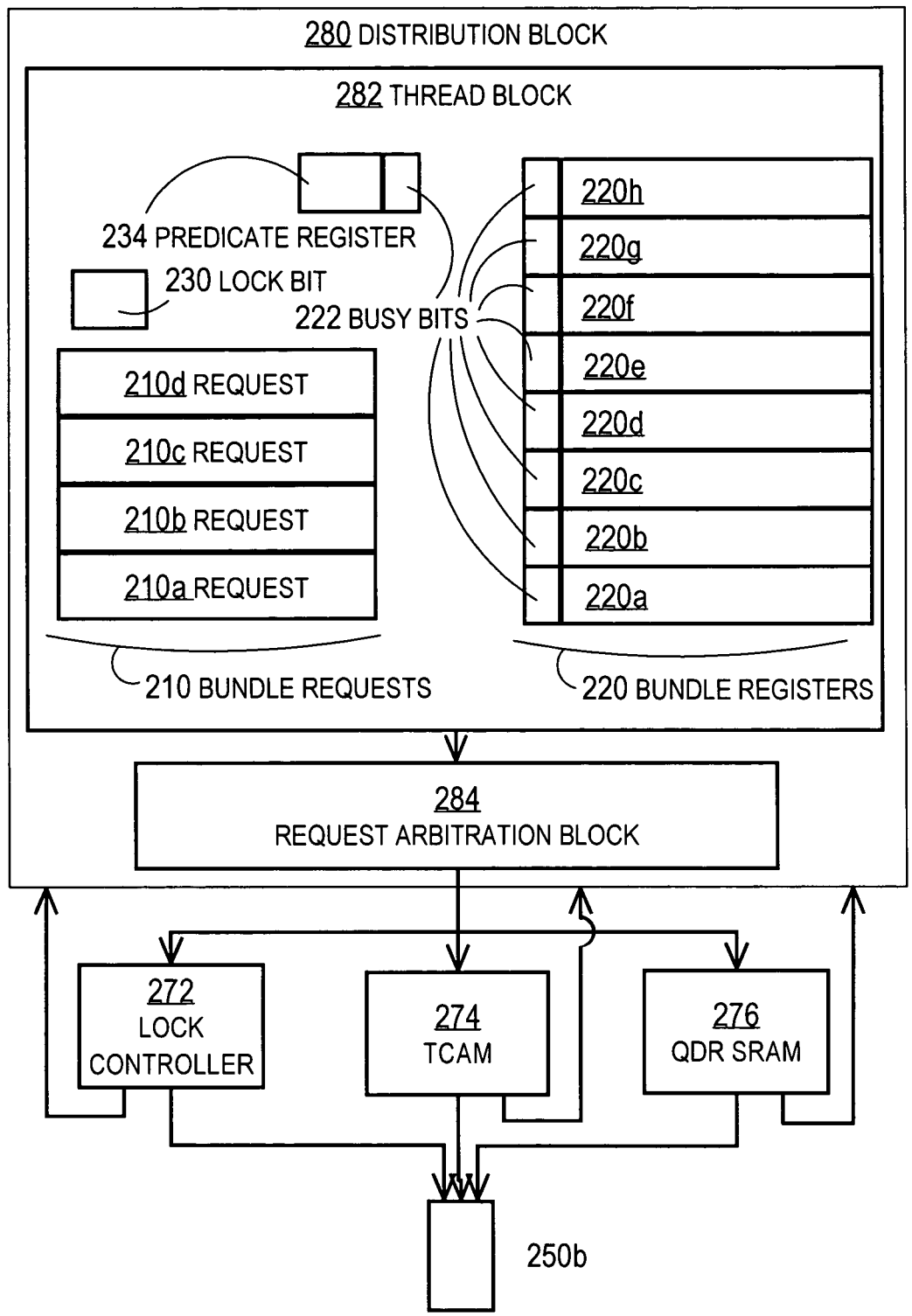
FIG. 2B is a block diagram that illustrates shared resources and a distribution block for the system of FIG. 2A, according to an embodiment.

FIG. 2B is a block diagram that illustrates shared resources and a distribution block 280 for the system of FIG. 2A, according to an embodiment. In the illustrated embodiment, the distribution block 280 includes a request arbitration block 284 and multiple thread blocks 282. Each thread block 282 includes a bundle requests queue 210, bundle registers 220, a lock bit 230 and a predicate register 234. Each register of the predicate register 234 and bundle registers 220 includes a busy bit 222. The shared resources block also includes lock controller 272, TCAM 274, QDR SRAM 276 and bus 250*b*, as described above for FIG. 2A.

The bundle requests queue 210 includes an entry for each request in the largest request bundle. For purposes of illustration, it is assumed a request bundle is limited to 4 requests for locks or shared resources; therefore, bundle requests queue 210 includes four request entries 210*a*, 210*b*, 210*c*, 210*d*. Thus a thread is allowed only one active bundle at a time. The queue 210 is a first in first out (FIFO) queue in the illustrated embodiment. As each request is forwarded to the appropriate lock controller or shared resource, the next request becomes the top request (the "next out") in the bundle requests queue 210.

The bundle registers 220 hold any data included in the request bundle for use in any request included in the bundle. The bundle registers also hold any data generated as a result of any request, and enables a result from one request to be used with a subsequent request or request result. In an illustrated embodiment, two registers are allowed for each request; thus the bundle registers 220 include eight registers, two for each of the up to four requests per bundle.

The lock bit 230 is needed in request bundles that involve a lock. A request for a shared resource is not performed unless the lock bit is set to indicate "GRANTED." In requests involving a lock, the lock bit is set to indicate "NOT GRANTED" when the lock request is sent to the lock controller. When the lock controller grants the lock, the lock bit is set to indicate "GRANTED." In request bundles that do not involve a lock, the lock bit is ignored in some embodiments, and is automatically set to "GRANTED" in some embodiments. In some embodiments, the lock bit 230 is called a lock busy bit and is set to FALSE to indicate "GRANTED" and is set to TRUE to indicate "NOT GRANTED."

The predicate register 234 is used to conditionally skip a request, depending on a result of a previous request. In the illustrated embodiment, the predicate register is one bit to hold a logical value corresponding to TRUE or FALSE. If the source predicate register for a request is FALSE, the request is skipped and the predicate register is cleared.

The busy bits 222 included in each register is used to indicate whether the contents of the register are being updated and thus the contents of the register are not in a condition to be used by a subsequent request.

The arbitration block 284 includes circuitry and logic to determine which thread block 282 has a request at the next out position that is forwarded on the next clock cycle. Any method may be used to make this determination. In an illustrated embodiment, a request in the first out position of bundle requests queue 210 is not eligible to be forwarded if the lock bit 230 indicates a lock is "NOT GRANTED" or any register used as input for the request has a busy bit set. In this embodiment, if multiple requests are eligible to be forwarded to the lock controller or a particular shared resource, the oldest eligible request is chosen for forwarding.

A shown in FIG. 2B, the arbitration block 284 forwards up to three requests to the lock controller and shared resources (up to one request each) on each processing cycle. The lock controller or shared resource processes the request during the cycle, and then outputs a result. The output goes on bus 250*b* and also returns to the distribution block 280 and thread blocks 282 thereon.

In the illustrated embodiment, the output from each shared resource is 8 bits of header that uniquely identifies the processor, the thread and bundle, and 64 bits of data from the shared resource, and 4 bits for the RC field 335, for 76 bits. The output from the lock controller is just the header for the lock being granted. To accommodate all this data, the width of data bus 250*b* is 160 bits. At each cycle, the scoreboards blocks 242 identify the results for their threads on bus 250*b* based on header bits. When the last of all results for all the requests in a bundle for a thread is received at a scoreboard block, that thread is deemed eligible to be switched onto the processor.

As depicted in FIG. 2B, the output from the lock controller 272 and shared resources also is directed to each thread block 282. There the result of the request is stored in the designated registers. For example, a lock result with a header indicating a particular thread is used to set the lock bit in the thread block (e.g., thread block 282*d*) for that thread. A result that identifies a request for a particular thread is stored in the destination register for that request. For example, an index from TCAM with a header that indicates the third request for a particular thread associated with thread block 282*b* is stored in the register indicated as the destination register for the third request, e.g. register 220*f* of thread block 282*b*, and the busy bit is set to off to indicate that the register is not busy, so its contents can be used in a subsequent request. A more complete example is described in more detail below.

FIG. 3A is a block diagram that illustrates a request format for one request command in a request bundle, according to an embodiment. In the illustrated embodiment, each request 300 includes 14 fields 301, 302, 303, 304, 305, 306, 307, 308, 309, 310, 311, 312, 313, 314, as listed in Table 1, respectively.

TABLE 1

Data fields in each request in a request bundle.

| Field Name | Size (bits) | Meaning |
| --- | --- | --- |
| VAL 301 | 1 | validity of request as determined by scoreboard block |
| ID 302 | 8 | request ID = 2 bits each for processor, thread, position in bundle |
| EOB 303 | 1 | end-of-bundle, set if last request in bundle |
| FUNC 304 | 2 | Indicates particular shared resource or lock controller as target |
| OP 305 | 6 | command understood at target |
| PRED SRC 306 | 1 | source predicate, command is skipped if predicate register 234 = FALSE and PRED SRC is on (e.g., =1). |
| IG RTN 307 | 1 | Ignore return, results need not be sent to processor (for example, the result is an intermediate result used only by a subsequent command) |
| FL 308 | 1 | free lock, after command is executed a lock on the shared resource can be released |
| SRC1 309 | 4 | indicates bundle register to be used as address operand input |
| SRC2 310 | 4 | indicates bundle register to be used as data operand input |

TABLE 1-continued

Data fields in each request in a request bundle.

| Field Name | Size (bits) | Meaning |
| --- | --- | --- |
| DEST 311 | 4 | indicted bundle register to store result as output |
| PRED DEST 312 | 1 | destination predicate, a one indicates the predicate register 234 should be set based on the output, |
| REG A 313 | 64 | Contents if known for register A = 2N−1 (N=request position in bundle) |
| REG B 314 | 64 | Contents if known for register B = 2N |

The fields FUNC 304 though PRED DEST 312, are stored in an entry in the bundle request queue 210 according to an illustrated embodiment. In some embodiments, one or more of VAL field 301, ID field 302 and EOB field 303 are also stored in a bundle requests queue entry. The fields REG A and REG B are stored in the next two bundle registers 220, e.g., 220a and 220b for the first request in a bundle. A value of zero in PRED SRC is taken to be the constant logical value TRUE; and a value of zero in SRC1 or SRC2 is taken to be the constant integer value 0.

FIG. 3B is a block diagram that illustrates a result format for a result from a shared resource in response to one request command in a request bundle, according to an embodiment. In the illustrated embodiment, each result 330 from a shared resource includes 3 fields, ID field 302 (as listed in Table 1), a 64 bit result field 333, and a 4 bit predicate return code (RC) field 335. For example, the index retrieved from TCAM is indicated by data in result field 333. A value for the destination predicate field is based on a value returned in the RC field 335. A result from a lock controller 272 excludes the results field 333 and RC field 335. The lock request for a particular thread indicated by the contents of the ID field 302 is granted when a result is sent from the lock controller.

3.0 Method at Thread Scheduler

Figure 4:
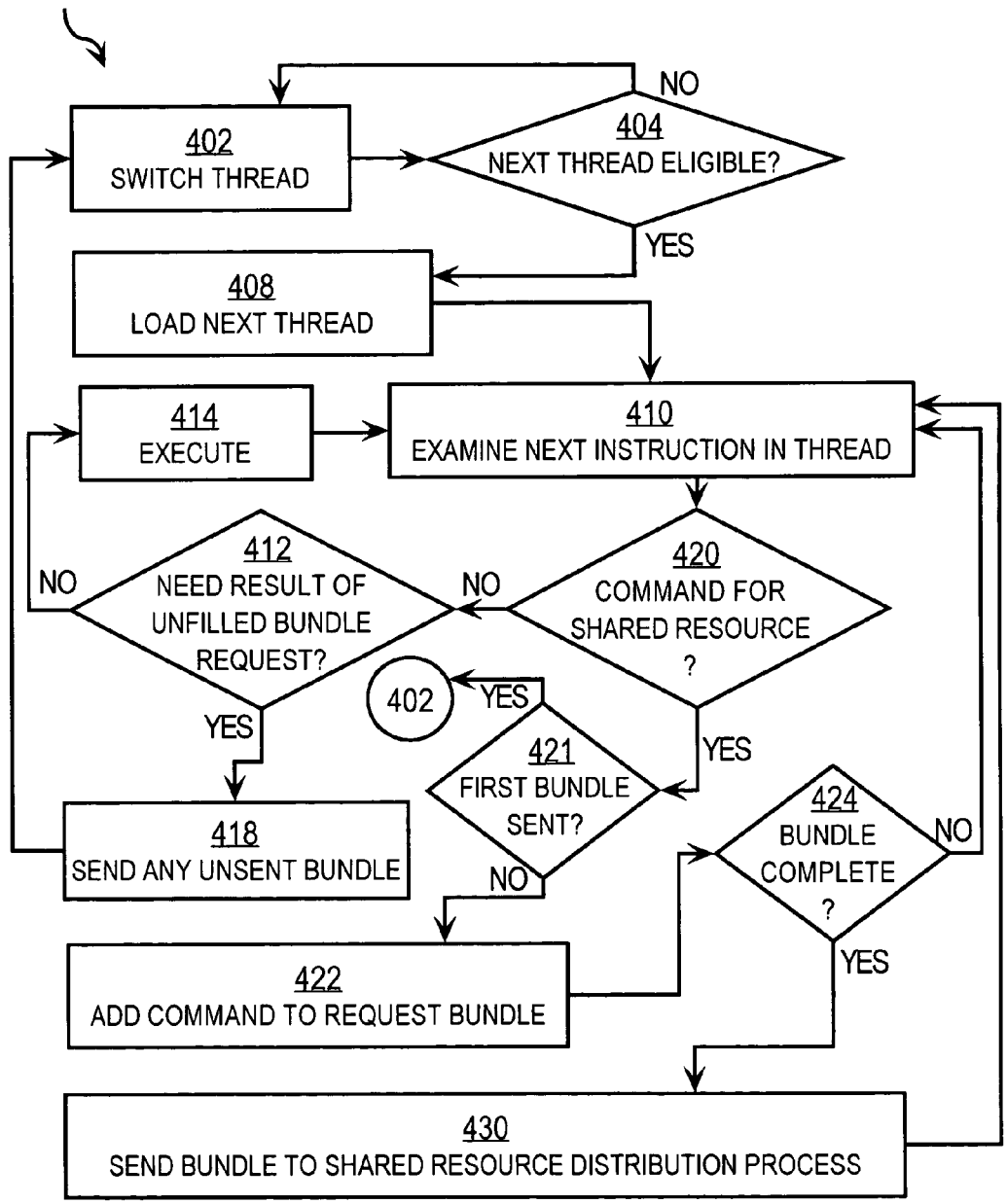
FIG. 4 is a flow diagram that illustrates a method for forming a request bundle at a processor, according to an embodiment using a thread scheduler.

FIG. 4 is a flow diagram that illustrates a method 400 for forming a request bundle at a processor, according to an embodiment using a thread scheduler. Although steps are shown in FIG. 4 and subsequent flow diagrams in a particular order for purposes of illustration, in other embodiments one or more steps are performed in a different order or overlapping in time by one or more processes acting in series or parallel, or one or more steps are omitted, or the method is changed in some combination of ways. For example, in various embodiments, some steps of method 400 are performed by the processor 240 based on instructions within the thread and some steps are performed by the processor based on instructions external to the thread in a thread scheduler or by the scoreboard block 242 in a separate circuit block external to the processor 240 or a scoreboard circuit block internal to the processor 240. In some embodiments, one or more steps are performed by a programmer, but are listed here in order to show how a programmer can decide when to introduce a switch thread command into a set of instructions for a thread.

In step 402 a switch thread operation is performed. Any method may be used to perform the switch thread operation. For example, a switch thread instruction is encountered in an instruction set for a thread, or an external thread scheduler determines that conditions are satisfied for switching a thread. Control then passes to step 404 to determine whether a next thread is both sleeping and eligible to be awakened. For example, it is determined whether there is a sleeping thread for which all requests in a request bundle have had results returned, e.g., as determined by a scoreboard block 242. As another example, it is determined whether a new thread has been introduced to a thread queue. If not, control passes back to step 402 to switch threads. Steps 404 and 402 loop until a sleeping thread is eligible to be reawakened or a new thread is found in step 404. If more than one thread is eligible, the thread scheduler determines which is next based on some arbitration policy, such as the first thread to go to sleep.

In an illustrated embodiment, step 404 includes comparing a FIFO of requests in scoreboard block 242 for a particular thread with a FIFO of results of those requests for teh same thread. When each entry in the FIFO of requests is matched by a result in the FIFO of results, all requests are filled and the thread is eligible to re-awaken.

If an eligible next thread is found in step 404, control passes to step 408. In step 408 the next eligible thread is loaded onto the processor, with whatever instructions and data were in the processor registers at the time the thread went to sleep. Control then passes to step 410.

In step 410, the next instruction in the thread is examined for execution with the values just restored to the registers of the processor. In some embodiments, instructions are executed until a switch thread command is issued and control passes to step 402. In the illustrated embodiment, a thread scheduler determines when to switch threads based on collecting as many shared resource requests as possible into a bundle and performing as many instructions as possible before switching threads.

In step 420, it is determined whether the next instruction involves a request (also called a command or operation) for a shared resource or lock on a shared resource. If not, control passes to step 412, described below.

If it is determined in step 420 that the next instruction involves a request for a shared resource or a lock thereon, control passes to step 421. In step 421, it is determined whether a request bundle has already been sent during this wake cycle for the thread. If so, control passes to step 402 to switch threads, because only one request bundle is allowed per thread. If a request bundle has not already been sent, control passes to step 422. In step 422, the request is added to a request bundle for the thread. Step 422 includes generating a new request bundle if one has not already been started. Control then passes to step 424.

In step 424, it is determined whether the request bundle is complete. A request bundle is complete under any conditions suitable for the application. In an illustrated embodiment, a request bundle is complete when all related requests from shared resources have been assembled or when a maximum number of requests are included in the request bundle, whichever occurs first. For example, a series of requests are considered related requests if they follow in close succession, before any branching or termination of a thread or computation based on the data returned from the shared resources. A series of requests to shared resources between a lock request and a lock release are also considered related requests. In the illustrated embodiment, the maximum number of requests in a bundle is four, so after the fourth of four or more related requests, the bundle is complete.

If it is determined, in step 424, that the bundle is not complete, then control passes back to step 410 to examine the next instruction, without actually executing the instruction requesting the shared resource.

If it is determined, in step 424, that the bundle is complete, then control passes to step 430. In step 430 the bundle is sent to the shared resources block 270 to be next processed by the distribution block 280. In the illustrated embodiment, step 430 includes setting the EOB field 303 to indicate end of bundle. For example, when the release lock instruction is received, or a fourth instruction is received, it is determined in step 424 that the bundle is complete, and control passes to step 430. In step 430, the EOB field bit is set and the request bundle is sent by scoreboard block 242 over bus 250a to distribution block 280.

In some embodiments, control passes to step 402 after step 430 to switch to the next thread while the results for the request bundle are accumulated by the scoreboard block 242 acting as thread scheduler for the processor. In some embodiments, control passes back to step 410 to examine the next instruction and execute any instructions that do not involve the shared resources. Only when the next instruction involves the shared resource, does the thread go to sleep. This occurs when the next instruction is a request for a shared resource. This condition is caught in step 421, described above. This situation is also caught using step 412, described below.

In previous approaches, step 424 is omitted and every single request for a shared resource or lock thereon, causes the request to be sent in step 430 and then control passes to step 402 to switch threads and off-load the current thread to sleep. Unlike previous approaches, however, in method 400, step 424 is included and control passes from step 430 to step 410 so that the thread stays awake and examines the next instruction and accumulates several requests for shared resources or locks thereon. Method 400 reduces the number of sleep cycles a thread undergoes to make several requests of shared resources.

If it is determined in step 420 that the next instruction does not include a request for a shared resource, then control passes to step 412. In step 412, it is determined whether a result from an unfilled request bundle is needed to execute the instruction. A request bundle is unfilled if at least one request is still outstanding without a result returned from the shared resource block. If a result from a still unfilled request bundle is needed, control passes to step 418 to send any unsent bundles and then to step 402 to switch threads. In some embodiments, step 418 includes setting the bit in the EOB field 303 of the last request in the unsent bundle.

If it is determined in step 412 that a result from an unfilled request bundle is not needed to execute the instruction, control passes to step 414. In step 414 the instruction is executed and control passes back to step 410 to examine the next instruction.

Method 400 is one way a thread controller can automatically assemble a request bundle from instructions in a thread. In other embodiments, thread switching is self-controlled by thread instructions, and the instructions are written to explicitly switch threads only after issuing several shared resource requests. In some such embodiments, steps 410, 412, 418, 420, 421, 422, 424, 430 are followed by a programmer in writing instructions for a thread switch.

4.0 Method at Shared Resource Distribution Block

Figure 5A:
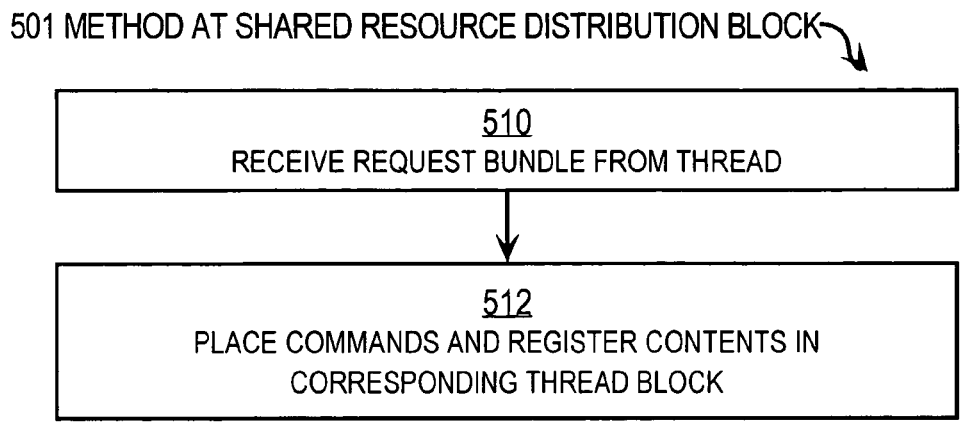
FIG. 5A is a flow diagram that illustrates a method for distributing request bundles at a shared resource distribution block, according to an embodiment.

FIG. 5A is a flow diagram that illustrates a method 501 for distributing request bundles at a shared resource distribution block, according to an embodiment. In step 510 a request bundle is received from a thread, one bundle operation per cycle.

For purposes of illustration, it is assumed that the request bundle includes the requests listed in Table 2. All requests are valid as indicated by the value 1 in the VAL field 301. The ID field 302 holds eight bits that indicate the processor, thread, and location in the bundle. The four processors, threads, and bundle locations are indicated by the four binary values 00, 01, 10, 11 corresponding to decimal values 0, 1, 2, 3. It is further assumed for purposes of illustration that the request bundle is received from the third processor (processor 2), and second thread (thread 1) represented by leading bits 1001 followed by the two bits for the bundle location Thus the ID values for locations 00 through 11 range from 100100 (decimal 36) to 100111 (decimal 39).

TABLE 2

Example request bundle.

| Field Name | Request 1 | Request 2 | Request 3 | Request 4 |
|---|---|---|---|---|
| VAL 301 | 1 | 1 | 1 | 1 |
| ID 302 | 36 | 37 | 38 | 39 |
| EOB 303 | 0 | 0 | 0 | 1 |
| FUNC 304 | LOCK | TCAM | QDR | QDR |
| OP 305 | get | lookup + read SRAM | atomic add child | atomic add parent |
| PRED SRC 306 | 0 | 0 | 0 | 1 |
| IG RTN 307 | 1 | 0 | 0 | 0 |
| FL 308 | 0 | 0 | 0 | 1 |
| SRC1 309 | 1 | 2 | 3 | 5 |
| SRC2 310 | 0 | 0 | 4 | 4 |
| DEST 311 | 0 | 3 | 5 | 6 |
| PRED DEST 312 | 0 | 0 | 1 | 0 |
| REG A 313 | lock ID | 0 | 0 | 0 |
| REG B 314 | TCAM key | byte count | 0 | 0 |

The first request is a request to acquire a lock on a resource specified in register 1 (e.g., register 220a). The first request also includes the contents of register 1 in the REG A field and the contents of register 2 (e.g., register 220b) in the REG B field. The contents of register 1 indicate a value for a lock ID. A lock ID indicates a portion of a shared resource to be locked, such as an address or address block in a memory. For purposes of illustration, it is assumed that the lock ID indicates a particular portion of the TCAM, so that no other process is allowed to use that portion of the TCAM so long as the thread that sent the example request bundle holds a lock. The contents of register 2 (e.g., register 220b) indicate a TCAM key, such as a particular IP address associated with a data packet received by router 200.

The second request is a request to lookup an address in a small SRAM associated with a TCAM key and to retrieve the contents of that address in the small SRAM. It is assumed for the purposes of illustration that the route data structure has an address in the QDR, which is too large for an associated value in the TCAM itself, so is stored in a small SRAM integrated with the TCAM. A single operation to the integrated TCAM-small SRAM is used to retrieve the value in the SRAM associated with the TCAM key; that operation is the lookup+readSRAM. The second request indicates that the input to the lookup+readSRAM operation (SRC1 field 309) is the contents of register 2 (e.g., register 220b) and the output (DEST field 311) is register 3 (e.g., register 220c). The second request also includes in REG B field 314 the contents for register 4 (e.g., register 220d). Those contents indicate a byte count for a data packet directed to the IP address used as the TCAM key. This byte count is used to update two records in the QDR associated with the route.

The third request is an atomic add child operation for the QDR. An atomic add adds the value of a second operand (e.g., byte count) to the contents of a corresponding location (e.g., byte count field) stored in the data structure located at a memory address indicated by a first operand. An atomic add child is used when the data structure is a child of a parent data structure that also has to be updated for consistency. The need for consistency between parent and child data structures is a reason the lock is requested for these series of shared resource operations. The output of this operation is an address of the parent data structure and an indication of whether the packet is to be dropped. It is assumed for purposes of illustration that the child data structure includes a limit on the number of bytes in the byte count on a particular route during a certain interval of time. If this limit is exceeded, the packet is dropped. If the packet is dropped the parent structure is not updated. To accomplish this effect, the destination predicate register is set to cause the next request (updating the parent data structure) to be skipped. Therefore, the third request uses as first input (SRC 1 field 309) the contents of register 3 (e.g., register 220c, the address of the child data structure obtained from the TCAM during the second request) and the contents of register 4 (e.g., register 220d, the byte count for the data packet). The results of the third request are the address of the parent to be stored as indicated by DEST field 311 in register 5 (e.g., register 220e) and the logical result indicating whether the packet is not dropped to be stored in the predicate register (e.g., predicate register 234) as indicated by the value 1 in PRED DEST field 312. The value set in the predicate register 234 is set to TRUE or FALSE based on the values in the RC field 335 received in response to this request. No data is provided by the third request for the contents of registers 5 and 6 as indicated by the zeros in REG A field 313 and REG B field 314. Note that request 3 should not operate until request 2 has completed and stored the address of the child data structure in register 3 (e.g., register 220c).

The fourth request is an atomic add parent operation on the QDR. The inputs to the operation are the address of the parent data structure and the number of bytes to add. The former is stored as a result from the third request, as indicated in SRC1 field 309 in register 5 (e.g., register 220e). The latter is stored as indicated in SRC2 field 311 in register 4 (e.g., register 220d). Because the PRED SRC field 306 is set to 1, the fourth request is not executed unless the predicate register 234 has a logical TRUE, value. The fourth request is the last request in the bundle as indicated by the value 1 in the EOB field 303. Also, the lock obtained for the series of requests is released after the fourth request is executed, as indicated by a value 1 in the free lock (FL) field 308.

In step 512, the request and register contents are placed in the thread block that corresponds to the thread. For example, based on the first four bits, 1001 (decimal value 9), of the ID field 302 the distribution block 280 places the contents of the request bundle received in step 510 into the thread block 09 (of the 16 thread blocks numbered 00 through 15). During step 512, the registers and queues are initialized with null values, e.g., zeroes) and the busy bits are all set to an ON value (e.g., 1). The lock bit is sent to indicate GRANTED. The initial contents are overwritten by the contents of the request bundle. In an illustrated embodiment, fields 301 through 312 for the first request are written to the request entry 210a, REG A field 313 is written to register 220a, and REG B field 314 is written to register 220b, and busy bits in these two registers are turned off (set to an OFF value, e.g., 0).

Similarly, fields 301 through 312 for the second request are written to the request entry 210b, and REG B field 314 is written to register 220d, and the busy bits in this register is turned off. REG A field 313 is empty; so nothing is written to register 220c, and the busy bit stays on. Fields 301 through 312 for the third request are written to the request entry 210c. REG A field 313 and REG B field are empty; so nothing is written to registers 220e, 220f, and the busy bits stay on.

Fields 301 through 312 for the fourth request are written to the request entry 210d. REG A field 313 and REG B field are empty; so nothing is written to registers 220g, 220h, and the busy bits stay on. Table 3a shows the contents of the thread block registers, and the current request ID, after step 512 in the example.

TABLE 3a

Example contents of thread block registers after step 512.

| 220a | 220b | 220c | 220d | 220e | 220f | 220g | 220h | predicate | lock | ID |
|---|---|---|---|---|---|---|---|---|---|---|
| lock ID | TCAM key | null | byte count | null | null | null | null | null | YES | 36 |
| not busy | not busy | busy | not busy | busy | busy | busy | busy | busy | — | — |

Figure 5B:
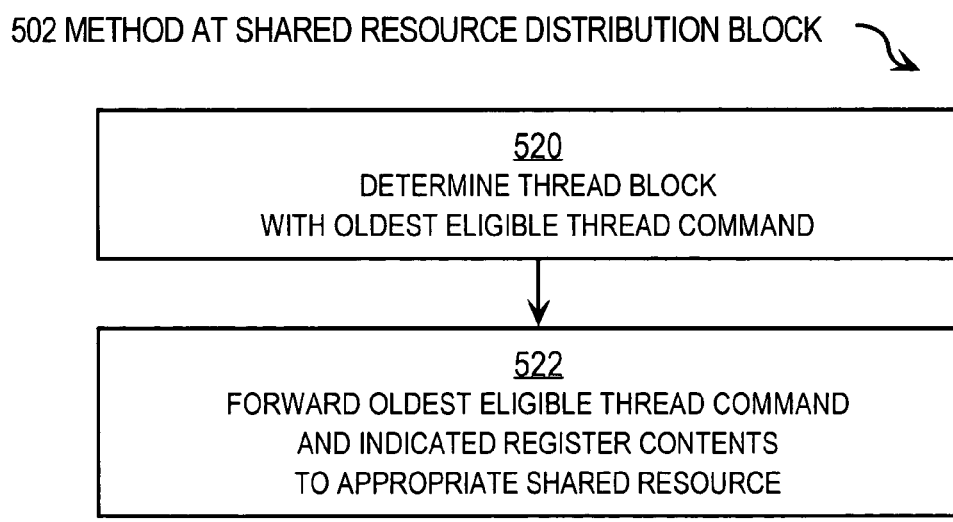
FIG. 5B is a flow diagram that illustrates a method for distributing requests within a request bundle among resources in a shared resource distribution block, according to an embodiment.

FIG. 5B is a flow diagram that illustrates a method 502 for distributing requests within a request bundle in a shared resource distribution block, according to an embodiment. In step 520 the thread block is determined that has the oldest eligible thread request.

In the illustrated embodiment, one request from one thread from one processor is received on each clock cycle, thus there is never more than one lock request at the top entry of any bundle request queue 210 at any one cycle. The request arbitration block 284 always forwards the lock request to the lock controller 272 on the first cycle after the lock request is written to the first entry. In embodiments that use a lock, the lock is the first request in a request bundle. To prevent deadlock, each thread can have at most one outstanding lock request. Thus, in the illustrated embodiment, a lock request is always eligible.

A non-lock request is eligible when registers 220 specified as source are not busy and the lock bit indicates a needed lock is GRANTED and the predicate register is not FALSE if the predicate register is a source for the command (as in the fourth request, above). Of all the eligible requests for a shared resource (e.g., TCAM), the oldest is determined in step 520.

Any method may be used to determine the oldest eligible request. In some embodiments, the arbitration block 284 uses a method as described by Robert Jeter and Kenneth Potter in "System and method for dynamic mirror-bank addressing" U.S. Published Patent Application Serial No. 20040186945, Sep. 23, 2004, (hereinafter, Jeter) the entire contents of which are hereby incorporated by reference as if fully set forth herein.

According to Jeter, an arbitration block includes multiple bitmaps used to select a request to forward. Specifically, an arbitration block has an order bitmap for each request queue, a global pending (PEND) bitmap, a global eligible bitmap, and compare logic. The order bitmaps indicate how long each particular request has been waiting at the head of its respective request queue. The PEND bitmap, which is used to set the order bitmaps, indicates which requests have yet to be issued. The eligible bitmap 443 indicates which requests are eligible to be issued. Based on the information in the order and eligible bitmaps, the compare logic determines which of the requests currently at the head of the request queues are allowed, and thus which are blocked, for example by performing a logical AND operation on the order and eligible bitmaps every cycle to determine which request will be forwarded during that cycle. Thus, request arbitration block 284 can determine in each cycle which request is the oldest eligible request for a particular resource.

In step 522, the oldest eligible request is forwarded to a lock manager or shared resource. In the illustrated embodiment, up to three requests can be forwarded on each cycle, one to the lock controller, one to the TCAM and one to the QDR. For the example in which the TCAM is integrated with a small SRAM, the TCAM/SRAM can receive a request on alternate cycles. The lock controller 272 and QDR can receive a request each cycle. The data forwarded includes the contents of any registers indicated in the PRED SRC field and SRC 1 field 309 and SRC2 field 310. When a lock request is forwarded, the lock bit is set to indicate lock NOT GRANTED. Table 3b shows the contents of the registers on thread block 282 and the current request ID for the example thread after the lock request in the first request is forwarded to the lock controller.

TABLE 3b

Example contents of thread block registers after step 522.

| 220a | 220b | 220c | 220d | 220e | 220f | 220g | 220h | predicate | lock | ID |
|---|---|---|---|---|---|---|---|---|---|---|
| lock ID | TCAM key | null | byte count | null | null | null | null | null | NO | 36 |
| not busy | not busy | busy | not busy | busy | busy | busy | busy | busy | — | — |

When received by the lock manager or other shared resource, the receiving component processes the request as is conventional for that component. Such conventional processing is well known in the art, and not described further here. The output is passed to the bus 250b, as shown in FIG. 2B and FIG. 3B.

Figure 5C:
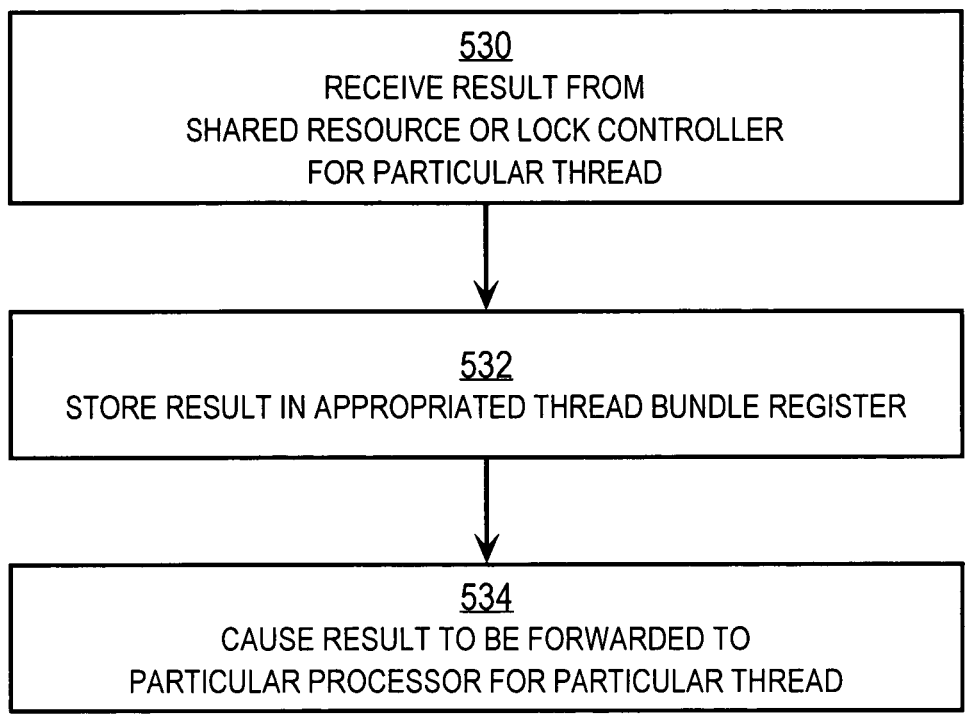
FIG. 5C is a flow diagram that illustrates a method for retaining results of a request from a request bundle at a shared resource distribution block, according to an embodiment.

FIG. 5C is a flow diagram that illustrates a method 503 for retaining results of a request from a request bundle at a shared resource distribution block 280, according to an embodiment.

In step 530, the result for a particular thread is received from the lock controller or shared resource. As shown in FIG. 2B, the output from the lock controller and shared resources are not only passed to bus 250b, but also back to the distribution block 282.

In step 532, the result is stored in an appropriate thread bundle register. Based on the contents of the ID field 302, the result is stored by the appropriate thread block. For example, when the lock controller grants the lock requested by the first request, the result is passed over an 8 bit bus and received by distribution block 280 with the value 36 in the ID field 302. Based on the value 36 with leading four bits 1001, the result is processed by thread block 09 and ignored by the other thread blocks. Based on the last two bits 00, the result is associated with the first request in the bundle, as stored in request entry 210a. Thus, the result is interpreted as a lock and the lock bit is set to indicate GRANTED. This makes the second request with ID 37 in request entry 210b eligible to be forwarded by the request arbitration block to the TCAM. Table 3c shows the contents of the registers on thread block 282 and the current request ID for the example thread after the first pass through step 532.

In step 534 the result is also passed to the particular processor where the thread is sleeping. In the illustrated embodiment, the result is placed on bus 250b for view by every processor 240. Based on the contents of the ID field 302, the result is used by the appropriate processor and ignored by the others. For example, when the lock controller grants the lock requested by the first request, the result is passed over an 8 bit portion of bus 250b with the value 36 in the ID field 302. Based on the ID field 302 contents 36 with leading two bits 10, the result is processed by the scoreboard block (e.g., block 242c) for processor 2 (the third processor, e.g., processor 240c) and ignored by the other scoreboard blocks. Based on the ID field 302 contents 36 with second two bits 01, the result is processed by the scoreboard block (e.g., block 242c) for thread 1 (the second thread). For example, the result is placed in the result FIFO for the second thread of the third processor. Thus, the scoreboard block determines that the first request has been filled for the second thread on the third processor. When all four requests are filled, the second thread is eligible to be awakened on the third processor (240c), as determined during step 404, described above.

When the TCAM sends the next result requested by the second request, the result is passed over a 76 bit bus and received by distribution block 280 with the value 37 in the ID field 302. Based on the value 37 with leading four bits 1001, the result is processed by thread block 09 and ignored by the other thread blocks. Based on the last two bits 01, the result is associated with the second request in the bundle, as stored in request entry 210b. Thus, the result is interpreted as an address for a child data structure and stored in register 3 (e.g., register 220c) and the register is marked not busy. This makes the third request with ID 38 in request entry 210b eligible to be forwarded by the request arbitration block to the QDR. Table 3d shows the contents of the registers on thread block 282 and the current request ID for the example thread after the second pass through step 532.

TABLE 3c

Example contents of thread block registers after step 532.

| 220a | 220b | 220c | 220d | 220e | 220f | 220g | 220h | predicate | lock | ID |
|---|---|---|---|---|---|---|---|---|---|---|
| lock ID | TCAM key | null | byte count | null | null | null | null | null | YES | 37 |
| not busy | not busy | busy | not busy | busy | busy | busy | busy | busy | — | — |

TABLE 3d

Example contents of thread block registers after second pass thru step 532.

| 220a | 220b | 220c | 220d | 220e | 220f | 220g | 220h | predicate | lock | ID |
|---|---|---|---|---|---|---|---|---|---|---|
| lock ID | TCAM key | child address | byte count | null | null | null | null | null | YES | 38 |
| not busy | not busy | not busy | not busy | busy | busy | busy | busy | busy | — | — |

When the QDR sends the third result requested by the third request, the third result is passed over a 76 bit bus and received by distribution block 280 with the value 38 in the ID field 302. Based on the value 38 with leading four bits 1001, the result is processed by thread block 09 and ignored by the other thread blocks. Based on the last two bits 10, the result is associated with the third request in the bundle, as stored in request entry 210c. Thus, the result is interpreted as an address for a parent data structure and stored in register 5 (e.g., register 220e) and the register is marked not busy. The predicate register is also set based on the result in the return code field 335, to FALSE if the packet is dropped as exceeding the limit in the child data structure and to TRUE if the packet is not dropped. For purposes of illustration, it is assumed that the predicate is set to TRUE.

These changes make the fourth request with ID 39 in request entry 210d eligible to be forwarded by the request arbitration block to the QDR. Table 3e shows the contents of the registers on thread block 282 and the current request ID for the example thread after the third pass through step 532.

TABLE 3e

Example contents of thread block registers after third pass thru step 532.

| 220a | 220b | 220c | 220d | 220e | 220f | 220g | 220h | predicate | lock | ID |
|---|---|---|---|---|---|---|---|---|---|---|
| lock ID | TCAM key | child address | byte count | parent address | null | null | null | TRUE | YES | 39 |
| not busy | not busy | not busy | not busy | not busy | busy | busy | busy | not busy | — | — |

When the QDR sends the fourth result requested by the fourth request, the fourth result is passed over a 76 bit bus and received by distribution block 280 with the value 39 in the ID field 302. Based on the value 39 with leading four bits 1001, the result is processed by thread block 09 and ignored by the other thread blocks. Based on the last two bits 11, the result is associated with the fourth request in the bundle, as stored in request entry 210d. Thus, the result is stored in register 6 (e.g., register 220f) and the register is marked not busy. Because the PRED DEST field 312 is zero, the predicate is not used and the predicate register is made null and set to busy. Because the FL field 208 is set to 1, the lock is released and lock bit set to indicate NOT GRANTED. In an illustrated embodiment, a implicit lock free f request is sent to the lock controller. If another thread is waiting for the lock just freed, that thread receives a lock result granting the lock.

This completes processing of the request bundle. Table 3f shows the contents of the registers on thread block 282 and the current request ID for the example thread after the fourth pass through step 532. At the same time, during step 534, the scoreboard block 242c for the third processor 240c receives the last result, and, during step 404, marks the second thread eligible for awakening on the processor 240c.

TABLE 3f

Example contents of thread block registers after fourth pass thru step 532.

| 220a | 220b | 220c | 220d | 220e | 220f | 220g | 220h | predicate | lock | ID |
|---|---|---|---|---|---|---|---|---|---|---|
| lock ID | TCAM key | child address | byte count | parent address | parent output | null | null | null | NO | null |
| not busy | not busy | not busy | not busy | not busy | not busy | busy | busy | busy | — | — |

Thus, using request bundles, such as described in FIG. 3A, and components described in FIG. 2B, including registers 220, with the methods described in FIG. 5A, FIG. 5B, and FIG. 5C, multiple requests are processed on one or more shared resources during a single wake-to-sleep cycle for a thread on a processor. This reduces thread overhead and increases the ability of a device, such as a router, to achieve higher throughput, such as line rate processing.

5.0 Implementation Mechanisms—Hardware Overview

Figure 6:
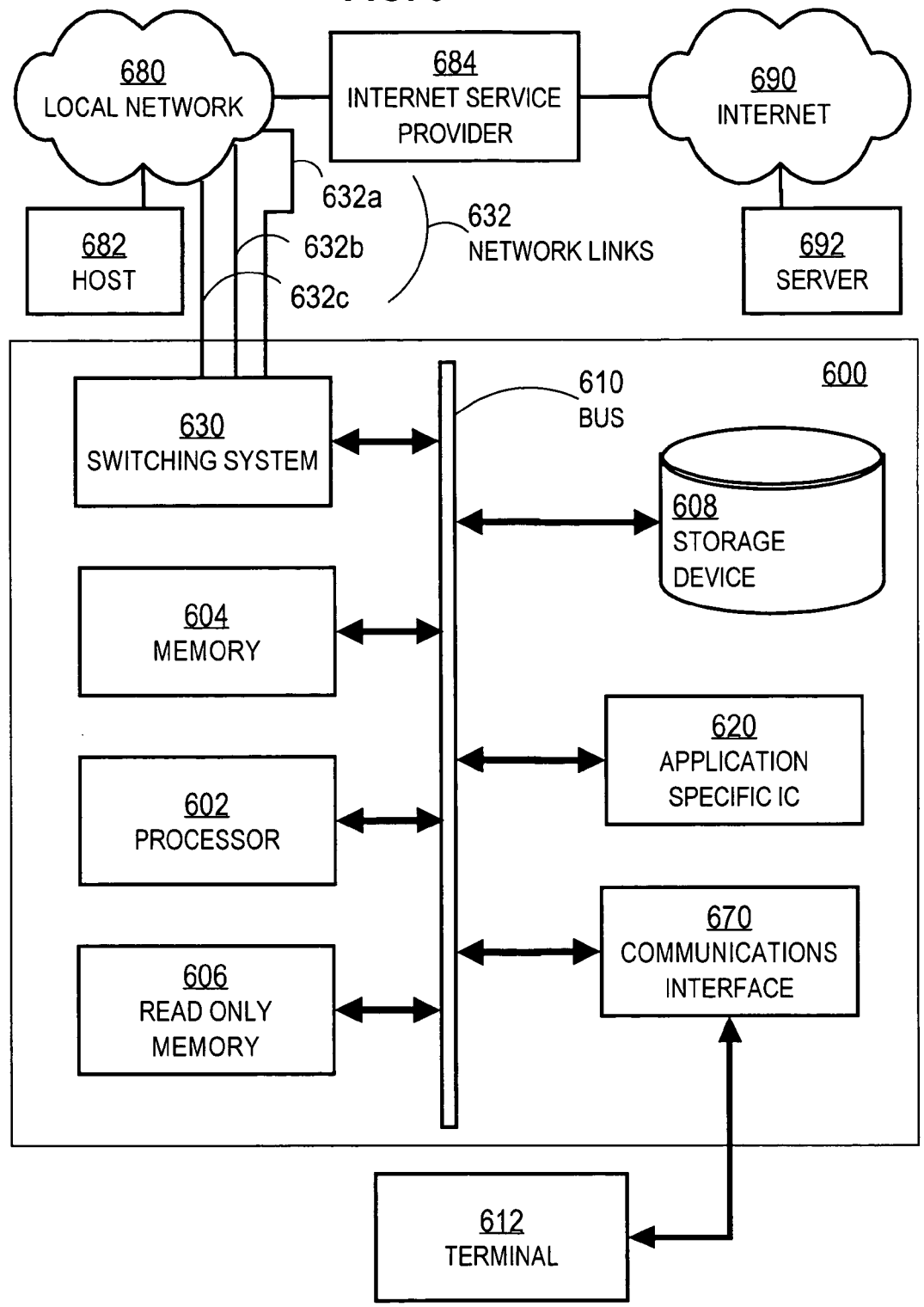
FIG. 6 is a block diagram that illustrates a computer system configured as a router upon which an embodiment of the invention may be implemented.

FIG. 6 is a block diagram that illustrates a computer system 600 serving as a router upon which an embodiment of the invention may be implemented by replacing one or more of conventional components described here with one or more components described above.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing requests from a processing thread for a shared resource shared among a plurality of processing threads, comprising:

receiving, from a portion of a thread that is executed during a single wake interval on a particular processor, a bundle of requests comprising a plurality of commands for one or more shared resources, wherein the bundle of requests includes one or more lock requests and data corresponding to earlier request results;

processing the bundle of requests at the one or more shared resources to produce a bundle result;

sending the bundle result to the particular processor, wherein the thread undergoes no more than one wake interval to sleep interval cycle while the plurality of commands are processed at the one or more shared resources;

wherein the one or more lock requests, requests one or more locks for a particular portion of a particular resource of the one or more shared resources;

directing the lock request to a lock controller;

receiving from the lock controller a particular lock for the particular portion of the particular resource;

after receiving the particular lock, then processing a command that follows the lock request in the bundle of requests;
wherein the lock request is held in a lock controller request queue until the lock is granted; and
sending the request to a next shared resource after the processing the command.

2. A method as recited in claim 1, further comprising:
forming the bundle of requests by a thread during a single wake interval of the thread on the particular processor; and
switching threads at the particular processor after forming the bundle of requests.

3. A method as recited in claim 2, further comprising sending each request in the bundle of requests to a distribution process for the one or more shared resources on a bus shared by multiple processors during a time interval reserved for the particular processor.

4. A method as recited in claim 1, wherein said sending the bundle result further comprises sending a separate result to the particular processor for each command in the bundle of requests.

5. A method as recited in claim 1, wherein the plurality of commands includes one or more lock release requests for any lock granted for the particular portion of the particular resource.

6. A method as recited in claim 1, wherein said processing the bundle of requests at the one or more shared resources to produce a bundle result further comprises:
retaining a particular result from a command of the plurality of commands at a distribution process for the one or more shared resources; and
executing a subsequent command of the plurality of commands, which subsequent command uses the particular result as input.

7. A method as recited in claim 6, wherein said processing the bundle of requests at the one or more shared resources to produce a bundle result further comprises:
determining whether the particular result has been stored in a local register for the distribution process, which register is not in the particular processor; and
if it is determined that the particular result has been stored in the local register, then executing the subsequent command.

8. An apparatus for processing requests from a processing thread for a shared resource shared among a plurality of processing threads, comprising:
means for receiving, from a portion of a thread that is executed during a single wake interval on a particular processor, a bundle of requests comprising a plurality of commands for a first shared resource of a plurality of shared resources wherein the bundle of requests includes one or more lock requests and data corresponding to earlier request results;
means for processing the bundle of requests at the first resource of the plurality of shared resources to produce a bundle result, the processing means including a processor;
wherein the thread undergoes no more than one wake interval to sleep interval cycle while the plurality of commands are processed at the first resource of the plurality of shared resources;
wherein the one or more lock requests, requests one or more locks for a particular portion of the first resource;
directing the lock request to a lock controller;
receiving from the lock controller a particular lock for the particular portion of the first resource;
after receiving the particular lock, then processing a command that follows the lock request in the bundle of requests;
wherein the lock request is held in a lock controller request queue until the lock is granted; and
sending the request to a second shared resource after the processing the command, wherein the second shared resource is a next resource in a ring of resources comprising the plurality of shared resources.

9. An apparatus for processing requests from a processing thread for a shared resource shared among a plurality of processing threads, comprising:
one or more multi-threaded processors that each allow alternate execution of a plurality of processing threads;
one or more shared resources shared among a plurality of processing threads; and
a shared resource distribution block disposed between the one or more multi-threaded processors and the one or more shared resources,
wherein the shared resource distribution block is configured to:
receive, from a portion of a particular thread that is executed during a single wake interval on a particular processor, a bundle of requests comprising a plurality of commands for one or more shared resources;
distribute the bundle of requests to the one or more shared resources to produce a bundle result;
trigger the bundle result to be sent to the particular processor while the particular thread undergoes no more than one wake interval to sleep interval cycle;
schedule a next eligible thread to reawaken from a thread queue comprising a plurality of sleeping threads, wherein a next eligible thread is determined to be eligible to reawaken if all requests in a corresponding previously sent request bundle are associated with a result or a candidate thread is new in the thread queue, and wherein commands associated with the previously send request bundle have been processed;
arbitrate reawakening eligible threads where more than one thread in the thread queue is eligible to be reawakened;
wherein the next eligible thread corresponds to a next eligible shared resource of the one or more shared resources.

10. An apparatus as recited in claim 9, further comprising a network interface for communicating a data packet there through.

11. An apparatus as recited in claim 9, further comprising one or more sequences of instructions stored in a computer-readable medium, which, when executed by the particular processor, causes the particular processor to:
form the bundle of requests by the particular thread during a single wake interval of the particular thread on the particular processor; and
switch threads at the particular processor after forming the bundle of requests.

12. An apparatus as recited in claim 11, wherein:
the one or more multi-threaded processors include a plurality of processors;
the apparatus further comprises a single bus connecting the plurality of processors to the shared resource distribution block; and
the one or more sequences of instructions further causes the particular processor to: send each request in the bundle of requests to the shared resource distribution block during a time interval reserved for the particular processor.

13. An apparatus as recited in claim 9, wherein said causing the bundle result to be sent further comprises causing a separate result to be sent to the particular processor for each command in the bundle of requests.

14. An apparatus as recited in claim 9, wherein the plurality of commands includes a lock request for a particular portion of a particular resource of the one or more shared resources.

15. An apparatus as recited in claim 14, wherein distributing the bundle of requests further comprises:
   directing the lock request to a lock controller;
   receiving from the lock controller a particular lock for the particular portion of the particular resource; and
   after receiving the particular lock, then distributing to the particular resource a command that follows the lock request in the bundle of requests.

16. An apparatus as recited in claim 14, wherein the plurality of commands includes a lock release for any lock granted for the particular portion of the particular resource.

17. An apparatus as recited in claim 9, wherein:
   the shared resource distribution block comprises a register for storing a result from a command executed by the one or more shared resources; and
   wherein distributing the bundle of requests to the one or more shared resources to produce a bundle result further comprises:
      receiving a particular result from a particular resource of the one or more shared resources in response to a particular command of the plurality of commands distributed to the particular resource,
      retaining the particular result in the register,
      retrieving the particular result from the register, and
      distributing a subsequent command of the plurality of commands, which subsequent command includes the particular result retrieved from the register.

18. An apparatus as recited in claim 17, wherein distributing the bundle of requests at the one or more shared resources to produce a bundle result further comprises:
   determining whether the particular result has been stored in the register; and
   if it is determined that the particular result has been stored in the register, then retrieving the particular result and distributing the subsequent command.

* * * * *